US011630356B2

(12) United States Patent
Hyodo et al.

(10) Patent No.: US 11,630,356 B2
(45) Date of Patent: Apr. 18, 2023

(54) DISPLAY DEVICE

(71) Applicant: Japan Display Inc., Tokyo (JP)

(72) Inventors: Yosuke Hyodo, Tokyo (JP); Shinichiro Oka, Tokyo (JP); Hirofumi Ohira, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/664,721

(22) Filed: May 24, 2022

(65) Prior Publication Data

US 2022/0397783 A1 Dec. 15, 2022

(30) Foreign Application Priority Data

Jun. 10, 2021 (JP) .............................. JP2021-097194

(51) Int. Cl.
| | | |
|---|---|---|
| *G02F 1/1343* | (2006.01) | |
| *G02F 1/1347* | (2006.01) | |
| *G02F 1/1339* | (2006.01) | |
| *G02F 1/1362* | (2006.01) | |

(52) U.S. Cl.
CPC .......... *G02F 1/1347* (2013.01); *G02F 1/1339* (2013.01); *G02F 1/134309* (2013.01); *G02F 1/136209* (2013.01); *G02F 1/136286* (2013.01); *G02F 2203/48* (2013.01)

(58) Field of Classification Search
CPC ................. G02F 1/1347; G02F 1/1339; G02F 1/134309; G02F 1/136209; G02F 2203/48; G02F 1/133601
See application file for complete search history.

(56) References Cited

U.S. PATENT DOCUMENTS

2011/0075070 A1* 3/2011 Kitagawa .......... G02F 1/133504
349/96
2018/0031897 A1 2/2018 Kikuchi et al.

FOREIGN PATENT DOCUMENTS

JP 2018-18043 A 2/2018

* cited by examiner

*Primary Examiner* — James A Dudek
(74) *Attorney, Agent, or Firm* — Maier & Maier, PLLC

(57) ABSTRACT

According to one embodiment, a display device includes a first display panel, a second display panel and an adhesive layer which adheres the first and second display panels. The first display panel includes a first scanning line, a first signal line, a first pixel electrically connected to the first scanning line and the first signal line, and the first pixel includes a first pixel electrode including first line portions extending parallel to the first signal line. The second display panel includes a second scanning line, a second signal line, and a second pixel electrically connected to the second scanning line and the second signal line, and the second pixel includes a second pixel electrode including second line portions intersecting the second signal line in plan view.

11 Claims, 11 Drawing Sheets

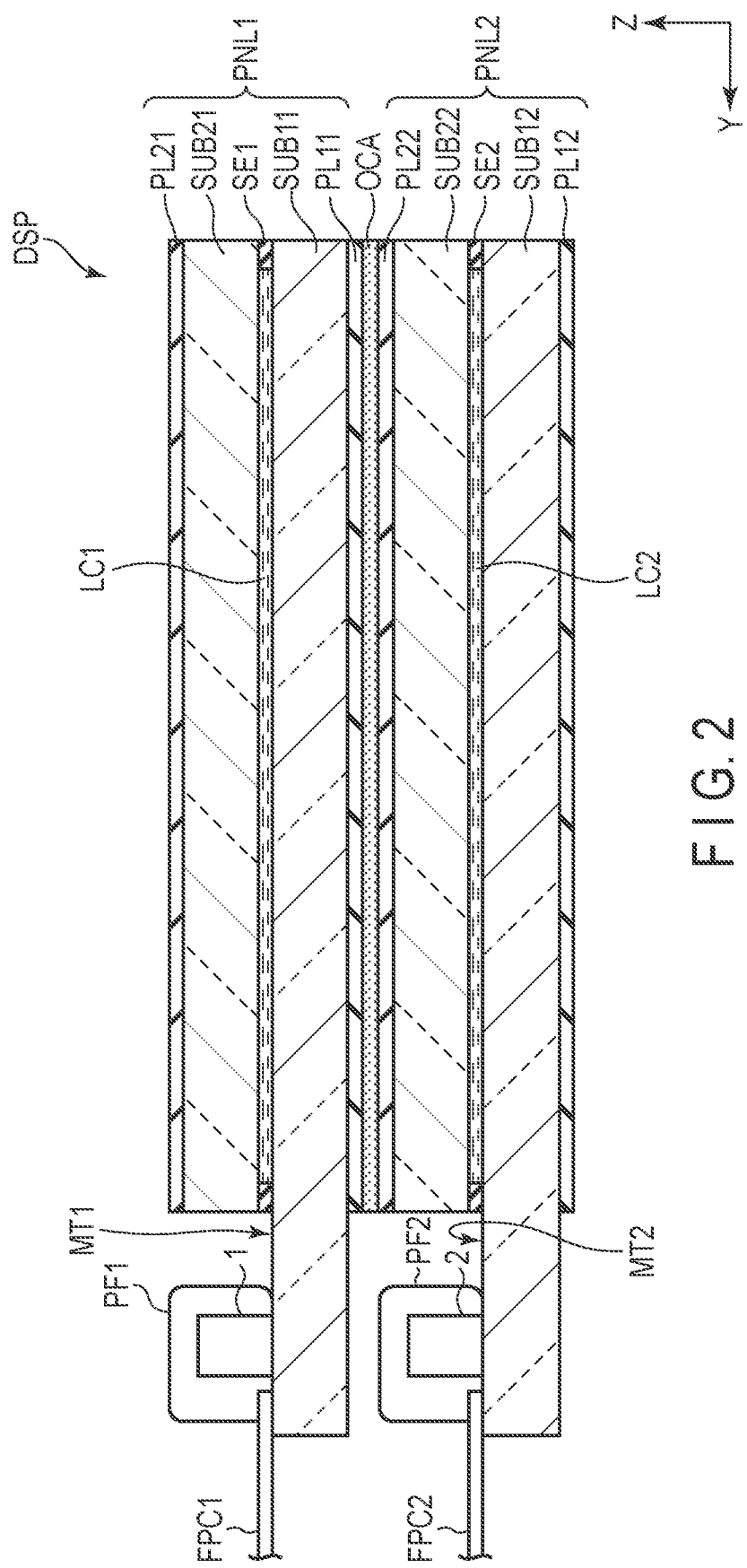
F I G. 2

… (1) DISPLAY DEVICE

CROSS-REFERENCE TO RELATED APPLICATIONS

This application is based upon and claims the benefit of priority from Japanese Patent Application No. 2021-097194, filed Jun. 10, 2021, the entire contents of which are incorporated herein by reference.

FIELD

Embodiments described herein relate generally to a display device.

BACKGROUND

In recent years, a technology has been developed that uses a display panel for dimming in addition to a display panel for displaying images in order to improve the contrast of display devices, and there is a demand of further improving the display quality of display devices configured by using this technology.

BRIEF DESCRIPTION OF THE DRAWINGS

FIG. 2 is a cross-sectional view schematically showing a configuration of the display device shown in FIG. 1.

DETAILED DESCRIPTION

Figure 1:
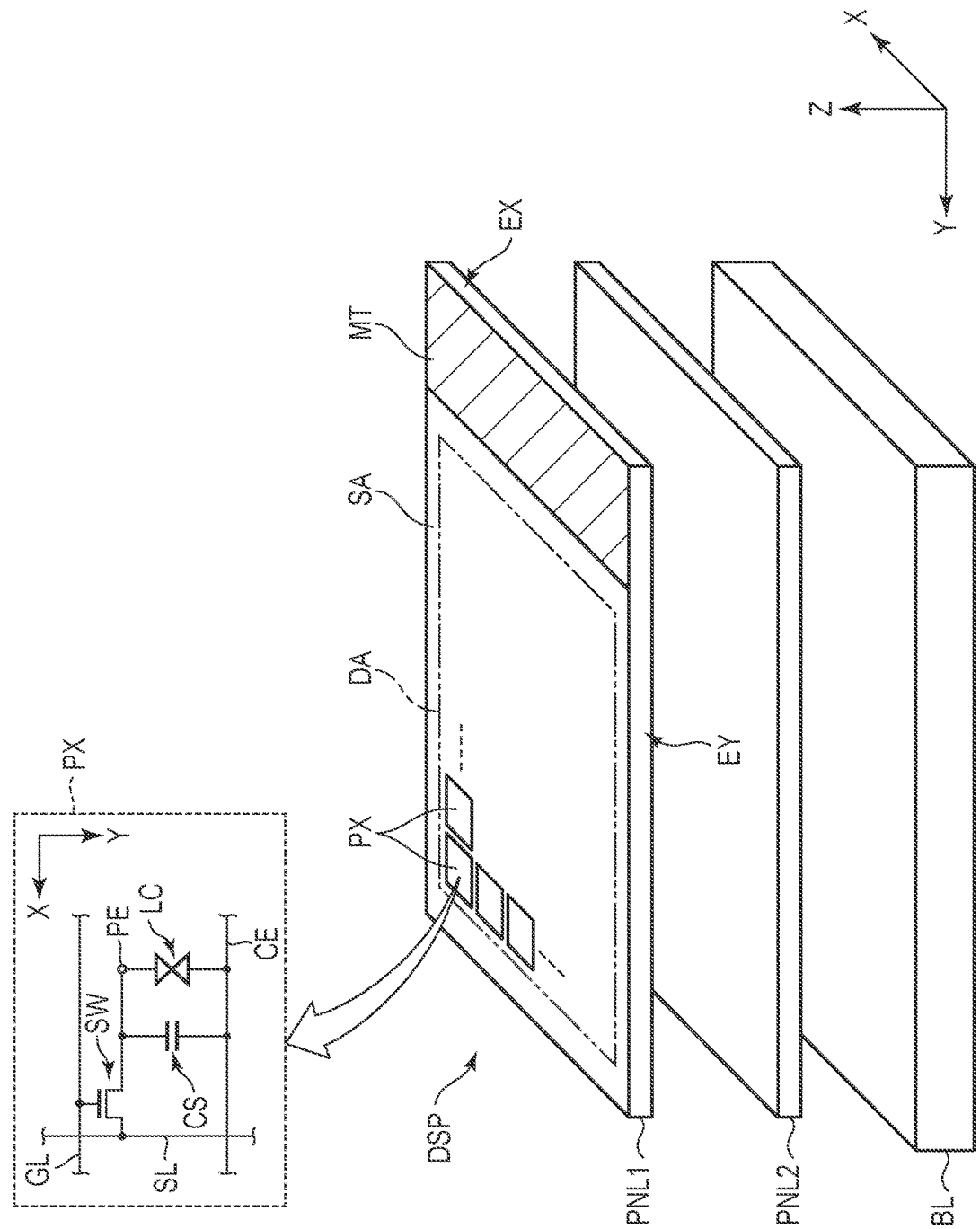
FIG. 1 is an exploded perspective view of a configuration example of a display device comprising two display panels.

In general, according to one embodiment, a display device comprises a first display panel including a display area for displaying images, a second display panel including a dimming area for controlling brightness of the display area and an adhesive layer which adheres the first display panel and the second display panel to each other. The first display panel comprises a first scanning line extending along a first direction, a first signal line extending in a second direction intersecting the first direction while bending in a first bending direction, a first pixel electrically connected to the first scanning line and the first signal line, and the first pixel includes a first pixel electrode including a plurality of first line portions extending parallel to the first signal line. The second display panel comprises a second scanning line extending along the first direction, a second signal line extending in the second direction while bending in a second bending direction, and a second pixel electrically connected to the second scanning line and the second signal line, and the second pixel includes a second pixel electrode including a plurality of second line portions intersecting the second signal line in plan view.

Embodiments will be described hereinafter with reference to the accompanying drawings.

The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

FIG. 1 is an exploded perspective view schematically showing a configuration of a display device DSP1 comprising two display panels. FIG. 1 illustrates a three-dimensional space defined by a first direction X, a second direction Y perpendicular to the first direction X and a third direction Z perpendicular to the first direction X and the second direction Y. Note that the first direction X and the second direction Y are orthogonal to each other, but may intersect at an angle other than 90 degrees. In the following descriptions, the third direction Z is defined as "upward" and a direction opposite to the third direction is defined as "downward". Further, with such expressions "a second member above a first member" and "a second member below a first member", the second member may be in contact with the first member or may be remote from the first member. In addition, it is assumed that there is an observation position to observe the display device DSP on a tip side of an arrow in a third direction Z, and viewing from this observation position toward the X-Y plane defined by the first direction X and the second direction Y is referred to as a planar view.

As shown in FIG. 1, the display device DSP comprises a liquid crystal display panel PNL1 (a first display panel), a dimming panel PNL2 (a second display panel) and a backlight unit BL. As shown in FIG. 1, the dimming panel PNL2 is placed between the liquid crystal display panel PNL1 and the backlight unit BL, and with this structure, the contrast of images displayed on the liquid crystal display panel PNL1 can be improved.

The liquid crystal display panel PNL1 is, for example, rectangular in shape. In the illustrated example, the liquid crystal display panel PNL1 includes a short edge EX parallel to the first direction X and the liquid crystal display panel PNL1 has a long edge EY parallel to the second direction Y. The third direction Z corresponds to the thickness direction of the liquid crystal display panel PNL1. A main surface of the liquid crystal display panel PNL1 is parallel to the X-Y plane defined by the first direction X and the second direction Y. The liquid crystal display panel PNL1 includes a display area DA and a peripheral area SA located on an outer side of the display area DA. The peripheral area SA includes a terminal area MT in which a driver IC and a flexible printed circuit board are mounted. In FIG. 1, the terminal area MT is indicated by shaded lines.

The display area DA is an area on which images are displayed and comprises a plurality of pixels PX arranged in a matrix, for example. As enlargedly shown in FIG. 1, each pixel PX is electrically connected to a respective scanning line GL and a respective signal line SL, and comprises a switching element SW, a pixel electrode PE, a common electrode CE, a liquid crystal layer LC and the like.

The switching element SW is constituted by a thin-film transistor (TFT), for example, and is electrically connected to a respective scanning line GL and a respective signal line SL. The scanning line GL is electrically connected to the switching element SW in each of those pixels PX aligned along the first direction X. The signal line SL is electrically connected to the switching element SW in each of the pixels PX aligned along the second direction Y. The pixel electrodes PE are connected to the switching elements SW, respectively. Each of the pixel electrodes PE opposes the common electrode CE, and the liquid crystal layer LC is driven by the electric field generated between the respective pixel electrode PE. A capacitance CS is formed, for example, between the electrode at the same potential as that of the common electrode CE and the electrode at the same potential as that of the pixel electrode PE.

The terminal area MT extends along the short side EX of the liquid crystal display panel PNL1. Terminal portions are formed in the terminal area MT, and the liquid crystal display panel PNL1 is electrically connected via the terminal portions to, for example, an external device such as a flexible printed circuit board and the like.

Figure 3:
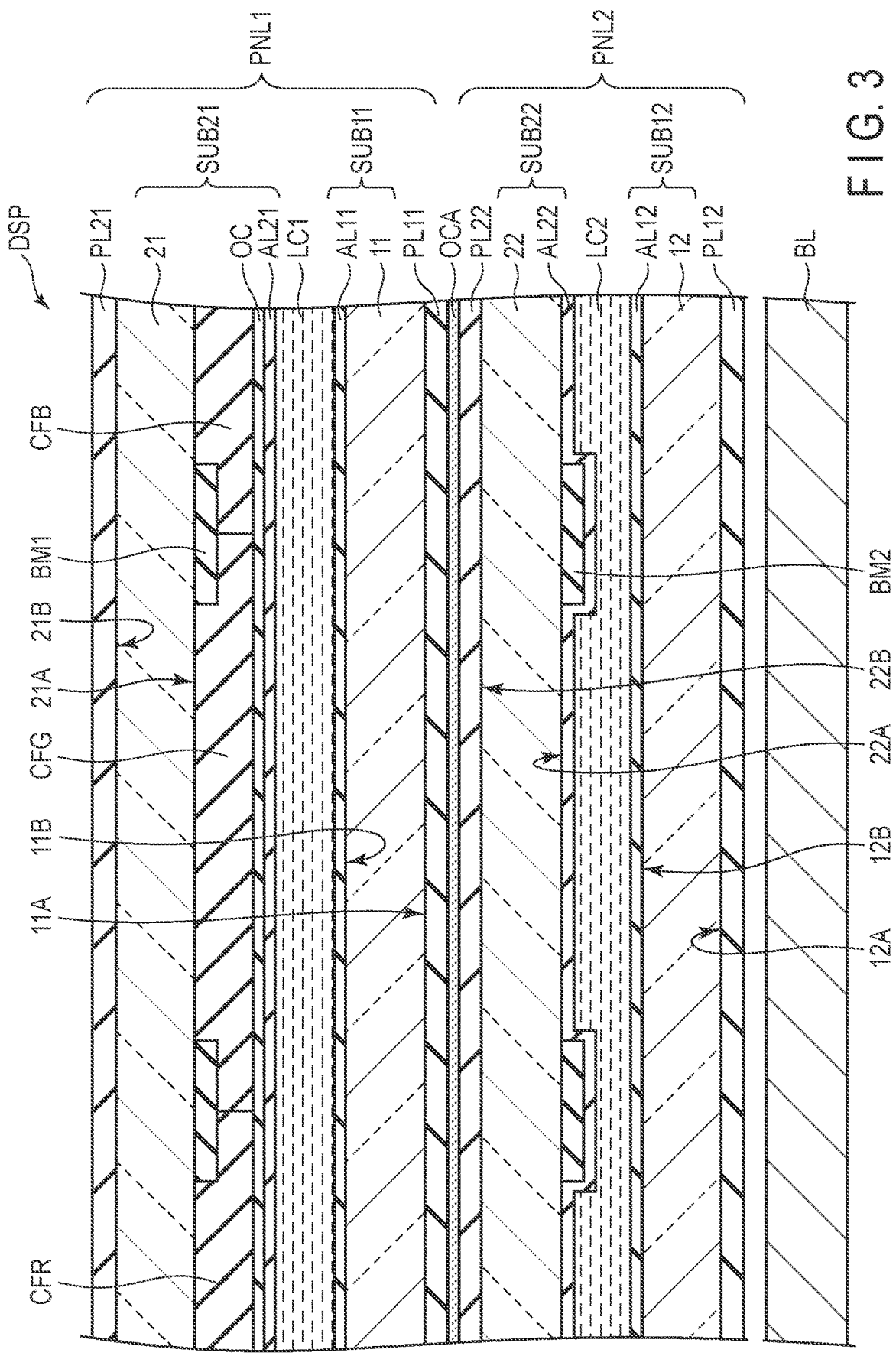
FIG. 3 is a cross-sectional view showing the display device shown in FIG. 2 in more detail.

Although the detailed configuration is omitted from the illustration in FIG. 1, the dimming panel PNL2 has basically the same configuration as that of the liquid crystal display panel PNL1. The configuration that partially differs between the liquid crystal display panel PNL1 and the dimming panel PNL2 is shown in FIGS. 2 and 3, as will be described below.

The backlight unit BL is located below the dimming panel PNL2, and the light from the backlight unit BL is controlled for every pixel PX, thus displaying images.

FIG. 2 is a schematic cross-sectional view showing the configuration of the display device DSP shown in FIG. 1.

As described above along with the description of FIG. 1, the display unit DSP comprise a liquid crystal display panel PNL1, a dimming panel PNL2 and a backlight unit BL. Note that in FIG. 2, the illustration of the backlight unit BL is omitted. The liquid crystal display panel PNL1 and the dimming panel PNL2 are adhered together with, for example, a transparent adhesive layer OCA. The common configuration between the liquid crystal display panel PNL1 and the dimming panel PNL2 is positioned so that they overlap each other in planar view and adhered by the adhesive layer OCA.

In the following descriptions, the configuration of the liquid crystal display panel PNL1 will be first described.

As shown in FIG. 2, the liquid crystal display panel PNL1 comprises a first substrate SUB11, a second substrate SUB21, a liquid crystal layer LC1, a first polarizer PL11 and a second polarizer PL21.

The liquid crystal layer LC1 is sandwiched between the first substrate SUB11 and the second substrate SUB21 and sealed by the sealant SE1. The first polarizer PL11 is placed under the first substrate SUB 11, and the second polarizer PL21 is placed above the second substrate SUB21. The first polarizer PL11 and the second polarizer PL21 include polarization axes which are positioned, for example, in a cross-Nicol relationship, that is, 90 degrees.

The terminal area MT1 of the liquid crystal display panel PNL1 contains the driver IC1 and the flexible printed circuit board FPC1 mounted thereon. The driver IC1 and the flexible printed circuit board FPC1 mounted on the terminal area MT1 are covered by a protective film PF1.

Next, the configuration of the dimming panel PNL2 will be described.

As shown in FIG. 2, the dimming panel PNL2, as in the case of the liquid crystal display panel PNL1, comprises a first substrate SUB12, a second substrate SUB22, a liquid crystal layer LC2, a first polarizer PL12 and a second polarizer PL22.

The liquid crystal layer LC2 is sandwiched between the first substrate SUB12 and the second substrate SUB22, and sealed by a sealant SE2. The first polarizer PL12 is disposed under the first substrate SUB12 and the second polarizer PL22 is disposed above the second substrate SUB22. The first polarizer PL12 and the second polarizer PL22 have polarization axes arranged, for example, in a cross-Nicol relationship, that is, 90 degrees. Further, the polarization axis of the first polarizer PL1 of the liquid crystal display panel PNL1 and the polarization axis of the second polarizer PL22 of the dimming panel PNL2 are directed in the same direction.

The terminal area MT2 of the dimming panel PNL2 contains the driver IC2 and the flexible printed circuit board FPC2 mounted therein. The driver IC2 and the flexible printed circuit board FPC2 mounted in the terminal area MT2 are covered by a protective film PF2.

Here, the configuration of the display device DSP will now be described in more detail with reference to the cross-sectional view shown in FIG. 3.

In the following descriptions, the configuration of the liquid crystal display panel PNL1 will first be described in detail.

As described above with the description of FIG. 2, the liquid crystal display panel PNL1 comprises a first substrate SUB11, a second substrate SUB21, a liquid crystal layer LC1, a first polarizer PL11 and a second polarizer PL21.

As shown in FIG. 3, the first substrate SUB11 comprises a first transparent substrate 11 and an alignment film AL11. In addition to the configuration described above, the first substrate SUB11 includes, for example, a scanning line GL (in more detail, scanning line GL1, which will be described later), a signal line SL (in more detail, signal line SL1 described later), a switching element SW, a pixel electrode PE (pixel electrode PE1, which will be described later), a common electrode CE and the like, shown in FIG. 1, but the illustrations of these are omitted from FIG. 3.

The transparent substrate 11 includes a main surface (lower surface) 11A and a main surface 11 The first transparent substrate 11 has a main surface (lower surface) 11A and a main surface (upper surface) 11B on an opposite side to the main surface 11A. On the main surface 11B side of the first transparent substrate 11, scanning lines GL, signal lines SL, switching elements SW, pixel electrodes PE, common electrode CE and the like are provided. On the main surface 11B side of the first transparent substrate 11, an alignment film AL11 is further provided to be in contact with the liquid crystal layer LC1. On the main surface 11A side of the first transparent substrate 11, the first polarizer PL11 is adhered.

As shown in FIG. 3, the second substrate SUB21 comprises a second transparent substrate 21, a light-shielding film BM1, color filters CF, an overcoat film OC and an alignment film AL21. The light-shielding film BM1 may be referred to as a light-shielding pattern.

The second transparent substrate 21 includes a main surface (lower surface) 21A and a main surface (upper surface) 21A on an opposite side to the main surface 21A. The main surface 21A of the second transparent substrate 21 opposes the main surface 11B of the first transparent substrate 11. The light-shielding film BM1 is provided on the main surface 21A side of the second transparent substrate 21 and, as in the case of the scanning lines GL and the signal lines SL, the pixels PX (in more detail, pixel PX1) are compartmentalized. The color filter CF partially overlaps the light-shielding film BM1. The color filter CF includes a red color filter CFR, a green color filter CFG, a blue color filter CFB and the like. The overcoat film OC covers the color filters CF. The overcoat film OC can prevent the pigments of the color filters CF from leaking into the liquid crystal layer LC1. The alignment film AL21 covers the overcoat film OC and is in contact with the liquid crystal layer LC1. On the main surface 21B side of the second transparent substrate 21, the second polarizer PL21 is adhered.

The first transparent substrate 11 and the second transparent substrate 21 are, for example, insulating substrates such as glass substrates or plastic substrates. The light shielding film BM1 should preferably be formed of a black resin in which black pigments or the like are dispersed. The alignment films AL11 and AL21 are horizontal alignment film having an alignment restriction force parallel to the X-Y plane. The alignment restriction force may be imparted by a rubbing process or a photo-alignment process.

Next, the configuration of the dimming panel PNL2 will be described in detail.

As described above with the description of FIG. 2, the dimming panel PNL2 comprises a first substrate SUB12, a second substrate SUB22, a liquid crystal layer LC2, a first polarizer PL12 and a second polarizer PL22.

As shown in FIG. 3, the first substrate SUB12 comprises a first transparent substrate 12 and an alignment film AL12. In addition to the configuration described above, the first substrate SUB12 includes a scanning line GL (in more detail, scanning line GL2, which will be described later), a signal line SL (in more detail, signal line SL2, which will be described later), a switching element SW, a pixel electrode PE (in more detail, pixel electrode PE2, which will be described later), a common electrode CE and the like as in the case of the liquid crystal display panel PNL1, but the illustrations of these are omitted from FIG. 3.

The first transparent substrate 12 includes a main surface (lower surface) 12A and a main surface (upper surface) 12B on an opposite side to the main surface 12A. On the main surface 12B side of the first transparent substrate 12, scanning lines GL and signal lines SL, switching elements SW, pixel electrodes PE, common electrodes CE and the like provided. On the main surface 12B side of the transparent substrate 12, an alignment film AL12 is further provided to be in contact with the liquid crystal layer LC. On the main surface 12A side of the first transparent substrate 12, the first polarizer PL12 is adhered.

As shown in FIG. 3, the second substrate SUB22 comprises a second transparent substrate 22, a light-shielding film BM2 and an alignment film AL22. The light-shielding film BM2 may be referred to as a light-shielding pattern as in the case of the light shading film BM1.

Unlike the liquid crystal display panel PNL1, the object of the dimming panel PNL2 is to control the brightness. Here, there is no need to form color images, and therefore no color filter CF is provided on the second substrate SUB22 of the dimming panel PNL2. Further, the dimming panel PNL2 differs from the liquid crystal display panel PNL1 as well in that the overcoat film OC is not provided. This is because there is no need to inhibit pigment (resin) from leaking to the liquid crystal layer LC2 due to the fact that a color filter CF is not provided as described above.

The second transparent substrate 22 includes a main surface (lower surface) 22A and a main surface (upper surface) 22B on an opposite side to the main surface 22A. The main surface 22A of the second transparent substrate 22 opposes the main surface 12B of the first transparent substrate 12. The light-shielding film BM2 is provided on the main surface 22A side of the second transparent substrate 22. The alignment film AL22 covers the light-shielding film BM2 and is in contact with the liquid crystal layer LC2. On the main surface 22B side of the second transparent substrate 22, the second polarizer PL22 is adhered.

FIG. 3 shows the case where the light shielding film BM2 is provided on the second transparent substrate 22 side as an example. But, the structure is not limited to this, but the light-shielding film BM2 may be provided on the transparent substrate 12 side. Unlike the light-shielding film BM1 of the liquid crystal display panel PNL1, the light-shielding film BM2 may be formed of an opaque metal material such as molybdenum (Mo), aluminum (Al), tungsten (W), titanium (Ti), titanium (Ti), silver (Ag) or the like, or may be formed of a black resin in which black pigments or the like are dispersed, as in the case of the light-shielding film BM1. When the light-shielding film BM2 is formed of an opaque metal material, the light-shielding film BM2 may be connected to the common electrode CE. With this configuration, the resistance value of the common electrode CE formed of ITO or the like can be kept low.

The first transparent substrate 12 and the second transparent substrate 22 are, for example, insulating substrates such as glass substrates or plastic substrates. The alignment films AL12 and AL22 are horizontal alignment films having an alignment restriction force substantially parallel to the X-Y plane. The alignment restriction force may be imparted by a rubbing treatment or a photo-alignment treatment.

The liquid crystal display panel PNL1 and the dimming panel PNL2 are adhered together by, for example, a transparent adhesive layer OCA. The common configuration between the liquid crystal display panel PNL1 and the dimming panel PNL2 is positioned by adjustment to overlap each other in plan view, and is adhered to the adhesive layer OCA.

The backlight unit BL is disposed below the dimming panel PNL2. As the backlight unit BL, various forms of backlight units can be used, such as those using light-emitting diodes (LEDs) as the light source, one using a cold cathode fluorescent lamp (CCFL), and the like. Note that although omitted from the illustration in FIG. 3, a cover member and the like may be disposed on the second polarizer PL21 of the liquid crystal display panel PNL1.

Figure 4:
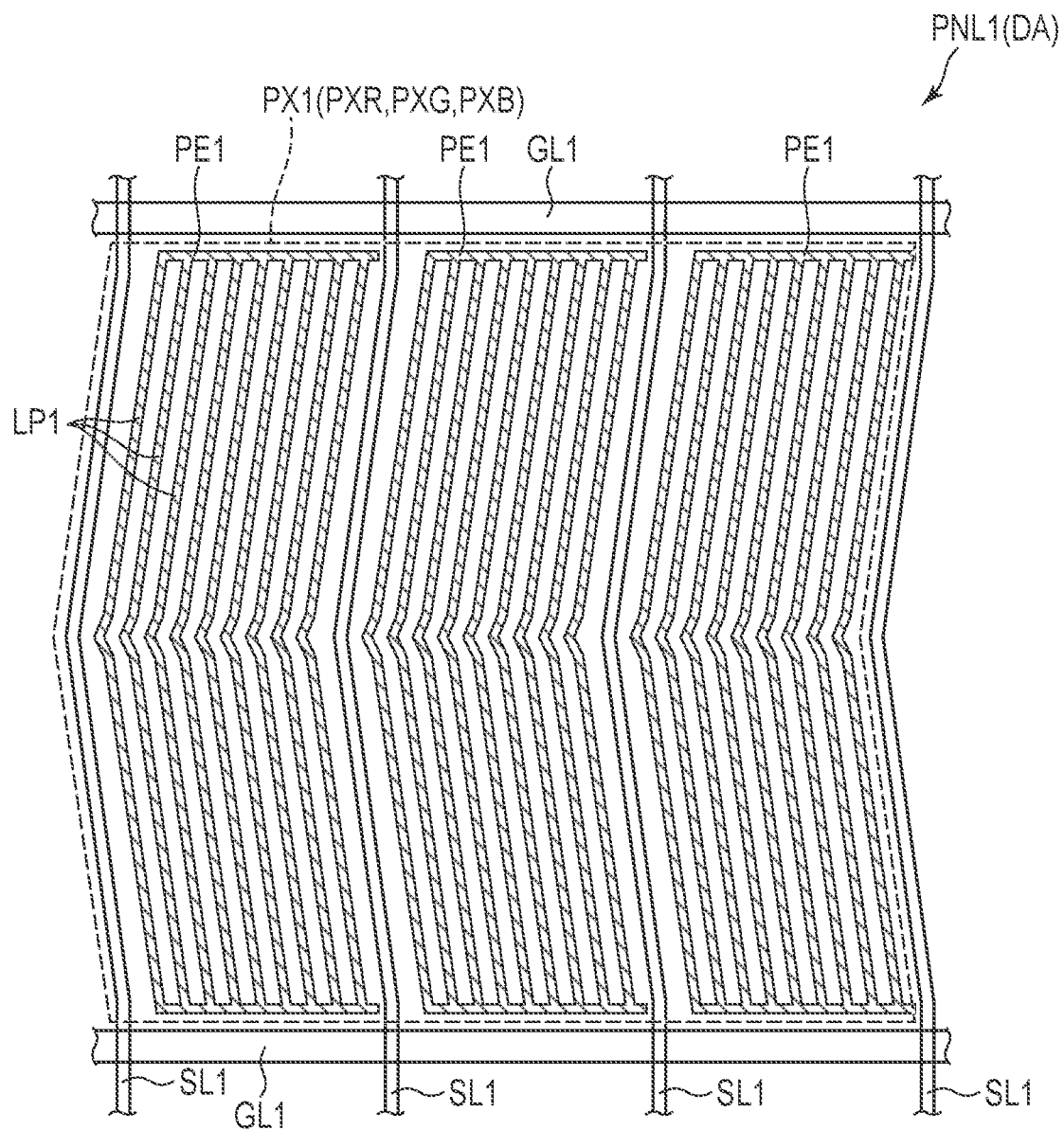
FIG. 4 is a plan view showing pixels arranged in a liquid crystal display panel according to one embodiment.

FIG. 4 is a plan view showing in detail the pixel PX1 disposed in the display area DA of the liquid crystal display panel PNL1. FIG. 4 shows one of a number of pixels PX1 arranged in the display area DA of the liquid crystal display panel PNL1.

In the display area DA of the liquid crystal display panel PNL1, a large number of pixels PX1 are arranged in a matrix. As shown in FIG. 4, each pixel PX1 includes red (R), green (G) and blue (B) sub-pixels PXR, PXG and PXB. The scanning line GL1 (the first scanning line) disposed between the pixels PX1 aligned along the second direction Y. The signal line SL1 (the first signal line) is disposed between sub-pixels PXR, PXG and PXB aligned along in the first direction X. The scanning lines GL1 extend in the first direction X and are aligned to be spaced apart from each other along the second direction Y. The signal lines SL1 extend along the second direction Y while bending in directions d1 and d2, which intersect the second direction Y, and are aligned to be spaced apart from each other along the first direction X. In this embodiment, an angle made between the second direction Y and the directions d1 and d2 is defined as eI. Note that the direction which makes an angle with the second direction Y is θ1 may be referred to as a first bending direction.

The sub-pixels PXR, PXG and PXB contained in each pixel PX1 include respective pixel electrodes PE1 (first pixel electrodes) of the same shape. Each pixel electrode PE1 is located in an area surrounded by two scanning lines GL1 and two signal lines SL1, respectively. Each pixel electrode PE1 includes a plurality of line portions LP1 (first line portions) aligned along the first direction X. The line portions LP1 are arranged to be spaced apart from each other at equal intervals along the first direction X. The line portions LP1 each extend along the second direction Y while bending in the directions d1 and d2 that intersect the first direction X. In other words, the line portions LP1 each extend parallel to the signal lines SL1, and the bending shape of the signal lines SL1 is the same as the bending shape of the line portions LP1 (the bending shape of the pixel electrodes PE1).

Figure 5:
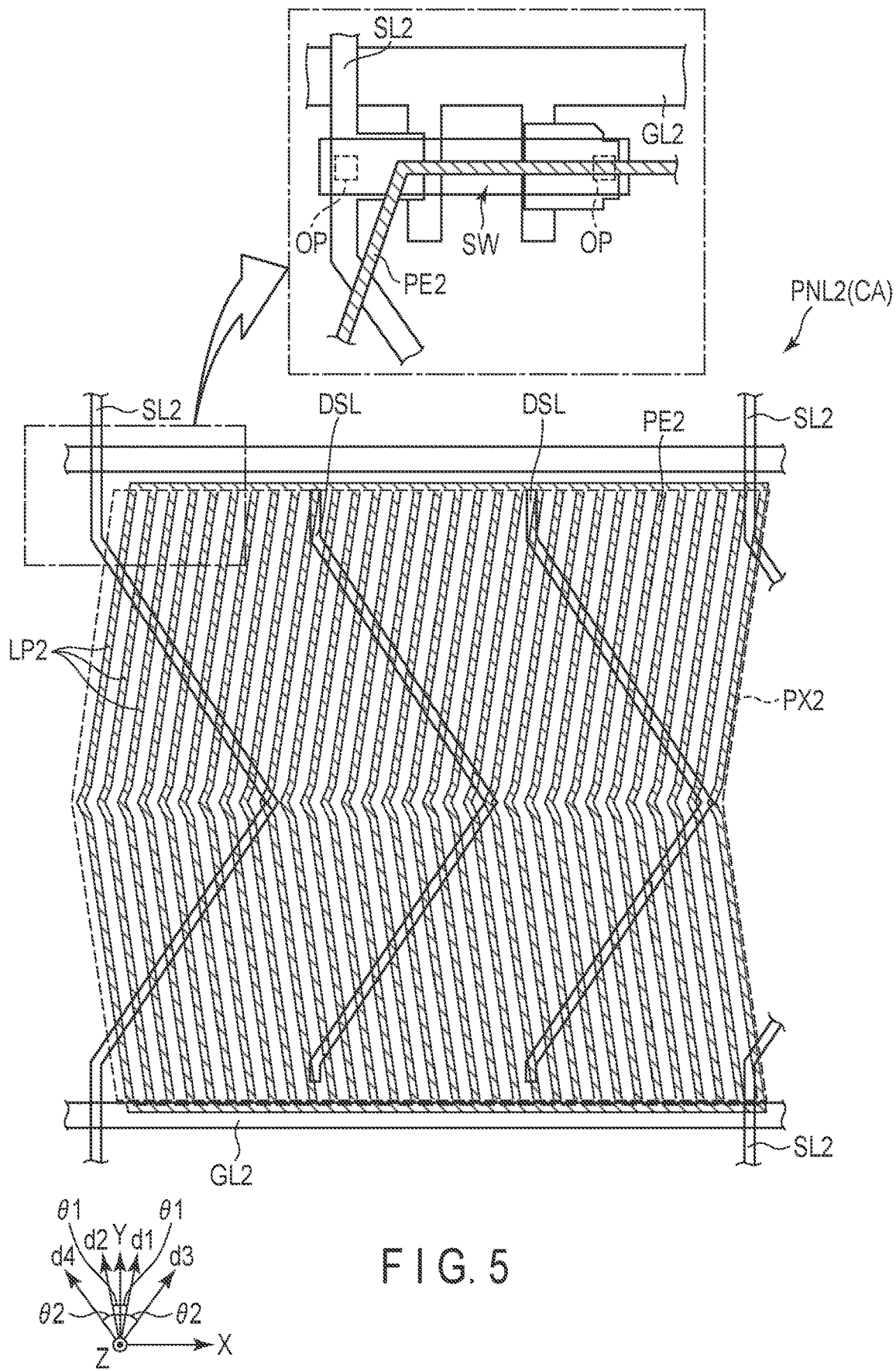
FIG. 5 is a plan view of pixels arranged in a dimming panel of the same embodiment in detail.

FIG. 5 is a plan view of the pixel PX2 located in the dimming area CA of the dimming panel PNL2. Note that FIG. 5 shows one of a number of pixels PX2 disposed in the dimming area CA of the dimming panel PNL2.

The dimming area CA of the dimming panel PNL2 is an area equivalent to the display area DA of the liquid crystal display panel PNL1 and overlaps the display area DA in plan view. In the dimming area CA, a number of pixels PX2 are arranged in a matrix. Unlike the liquid crystal display panel PNL1, an object of the dimming panel PNL2 is to control the brightness. Here, there is no need to form color images, and therefore no color filter CF is provided on the dimming panel PNL2 as described before. In other words, the pixel PX2 is different from the pixel PX1 of the liquid crystal display panel PNL1 in that it does not contain sub-pixels.

As shown in FIG. 5, the scanning lines GL2 (the second scanning line) each extend in the first direction X and arranged to be spaced apart from each other along the second direction Y. The signal lines SL2 (the second signal lines) extend along the second direction Y while bending in directions d3 and d4, which intersect the second direction Y, and are aligned at intervals along the first direction X. The signal lines SL2 (the second signal lines) are bent in a direction opposite to the direction of the signal lines SL1 of the liquid crystal display panel PNL1. In more detail, the signal lines SL1 of the liquid crystal display panel PNL1 are bent into an L shape, whereas the signal lines SL2 of the liquid crystal display panel PNL2 are bent is bent into a reversed L shape. In this embodiment, an angle made between the second direction Y and the directions d3 and d4 is defined as θ2. The angle θ2 exhibits a value larger than that of the angle θ1 mentioned above, and the signal lines SL2 are slightly inclined as compared to the signal lines SL1 of the liquid crystal display panel PNL1. Note that the direction whose angle with the second direction Y is θ2 may be referred to as the second bending direction.

Between two adjacent signal lines SL2 spaced apart from each other along the first direction X, a dummy signal line DSL is disposed. The dummy signal line DSL, as in the case of the signal lines SL2, extends in the second direction Y while bending in the directions d3 and d4. As described, the dummy signal line DSL thus disposed between two adjacent signal lines SL2 spaced apart from each other along the first direction X, it is possible to suppress the degradation of display quality caused by parallax displacement which can occur due to the overlapping of two display panels.

The pixel PX2 includes pixel electrodes PE2 (second pixel electrode). As enlargedly shown in FIG. 5, a pixel electrode PE2 is connected to the switching element SW via an opening OP SW and is electrically connected to the respective scanning line GL2 and the respective signal line SL2. Note that it is here assumed the case where the switching element SW is of a bottom-gate type TFT, but it is not limited to this. It may be of a top-gate type TFT.

The pixel electrode PE2 includes a plurality of line portions LP2 (second line portions) arranged along the first direction X. The line portions LP2 are disposed to be spaced apart from each other at equal intervals along the first direction X. The line portions LP2 each extend along the second direction Y while bending in the directions d1 and d2 which intersect the second direction Y. That is, the line portions LP2 has a shape similar to that of the line portions LP1 which constitute the pixel electrode PE1 of the liquid crystal display panel PNL1. Thus, when the bending shape of each line portions LP1 contained in the pixel electrode PE1 and the bending shape of each line portions LP2 contained in the pixel electrode LP2 are made similar to each other, it is possible to prevent the pixel electrode PE1 and the pixel electrode PE2 from being misaligned when the liquid crystal display panel PNL1 and the dimming panel PNL2 are superimposed.

As shown in FIG. 5, the line portions LP2 contained in the pixel electrode PE2 intersect the signal lines SL2 in plan view, which are electrically connected thereto. In more detail, the line portions LP2 extend along the second direction Y so as to cross (straddle) the signal lines SL2 in plan view, which are electrically connected thereto. The bending shape of the signal lines SL2 and the bending shape of the line portions LP2 (the bending shape of the pixel electrodes PE2) is different from each other in the bending direction and the angle with respect to the second direction Y (bending angle).

In this embodiment, it is assumed that the pixels PX2 of the dimming panel PNL2 have the same area as that of the pixels PX1 of the liquid crystal display panel PNL1, and one pixel PX1 is provided for one pixel PX2, but the configuration is not limited to this. For example, one pixel PX2 may be arranged for multiple pixels PX1. For example, one pixel PX2 may be provided for every four pixels PX1.

Figure 6:
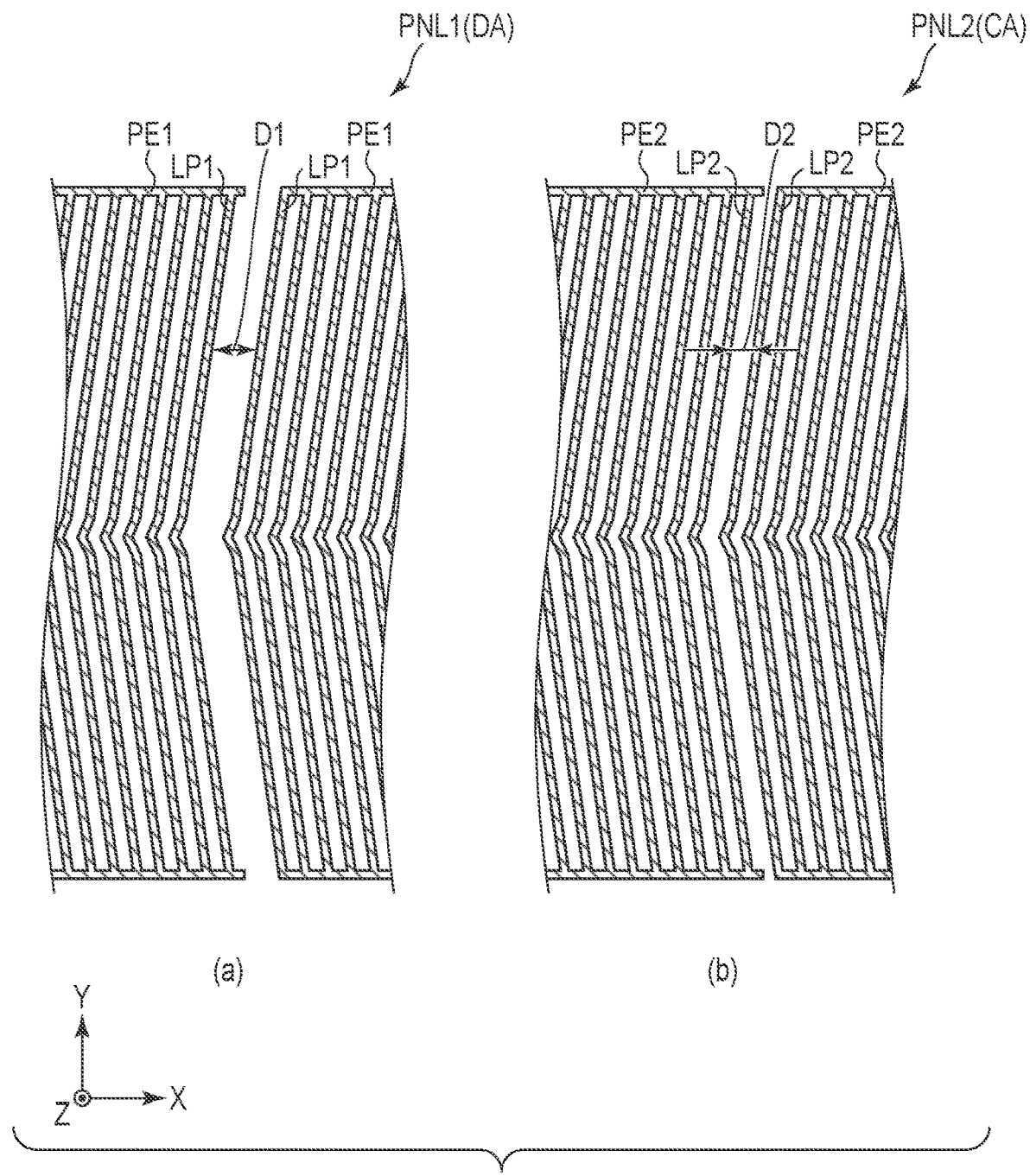
FIG. 6 is a plan view showing a part of two adjacent pixel electrodes disposed in a liquid crystal display panel and a part of two adjacent pixel electrodes disposed in a dimming panel in the same embodiment.

FIG. 6 is a plan view showing a part of two adjacent pixel electrodes PE1 disposed in the liquid crystal display panel PNL1 and a part of two adjacent pixel electrodes PE2 disposed in the dimming panel PNL2.

As described above, the pixel electrode PE1 of the liquid crystal display panel PNL1 is disposed in a region surrounded by two adjacent scanning lines GL1 and two adjacent signal lines SL1. Between two pixel electrodes PE1 adjacent to each other along the first direction X, a signal line SL1 is disposed between two adjacent pixel electrodes PE1 along the first direction X, and a distance D1 shown in FIG. 6, part (a) is provided between the two pixel electrodes PE1. With the distance D1 thus provided between two pixel electrodes PE1 adjacent to each other in the first direction X, it is possible to suppress one pixel electrode PE1 from interfering with the other pixel electrode PE1.

On the other hand, the pixel electrode PE2 of the dimming panel PNL2 is, as described above, not provided in the region surrounded by the two adjacent scanning lines GL2 and the two adjacent signal lines SL2. Therefore, between the two pixel electrodes PE2 adjacent to each other along the first direction X, the signal line SL2 is not located, and further, between the two pixel electrodes PE2, as shown in FIG. 6, part (b), only a distance D2, which is shorter than the distance D1 provided above, is provided between the two pixel electrodes PE2. The distance D2 is a value, for example, 10 µm or less, or a value equal to the distance between the two line portions LP2 adjacent to each other along the first direction X.

According to this configuration, one of the pixel electrodes PE2 adjacent to each other along the first direction X interferes with the other pixel electrode PE2, and therefore even if only the pixels PX2 including one pixel electrode PE2 are lit for display, part of the pixels PX2 including the other pixel electrode PE2 may be lit for display. However, in the pixels PX2 of the dimming panel PNL2, not only the pixels PX2 corresponding to the displaying pixels of the liquid crystal display panel PNL1, but also the pixels PX2 located therearound are controlled to be lit for display as a measure against parallax. Therefore, even if part of the pixels PX2 adjacent to the lit and displaying pixel PX2 are also lit for display, the display quality of the display device DSP is not affected. Conversely, according to the configuration shown in FIG. 6, part (b), the line portions LP2 of the pixel electrodes PE2 can be laid evenly in the dimming area CA, and the opening ratio of the dimming area CA can be improved as compared to the case where a spacing equivalent to the distance D1 of the liquid crystal display panel PNL1 is provided.

Figure 7:
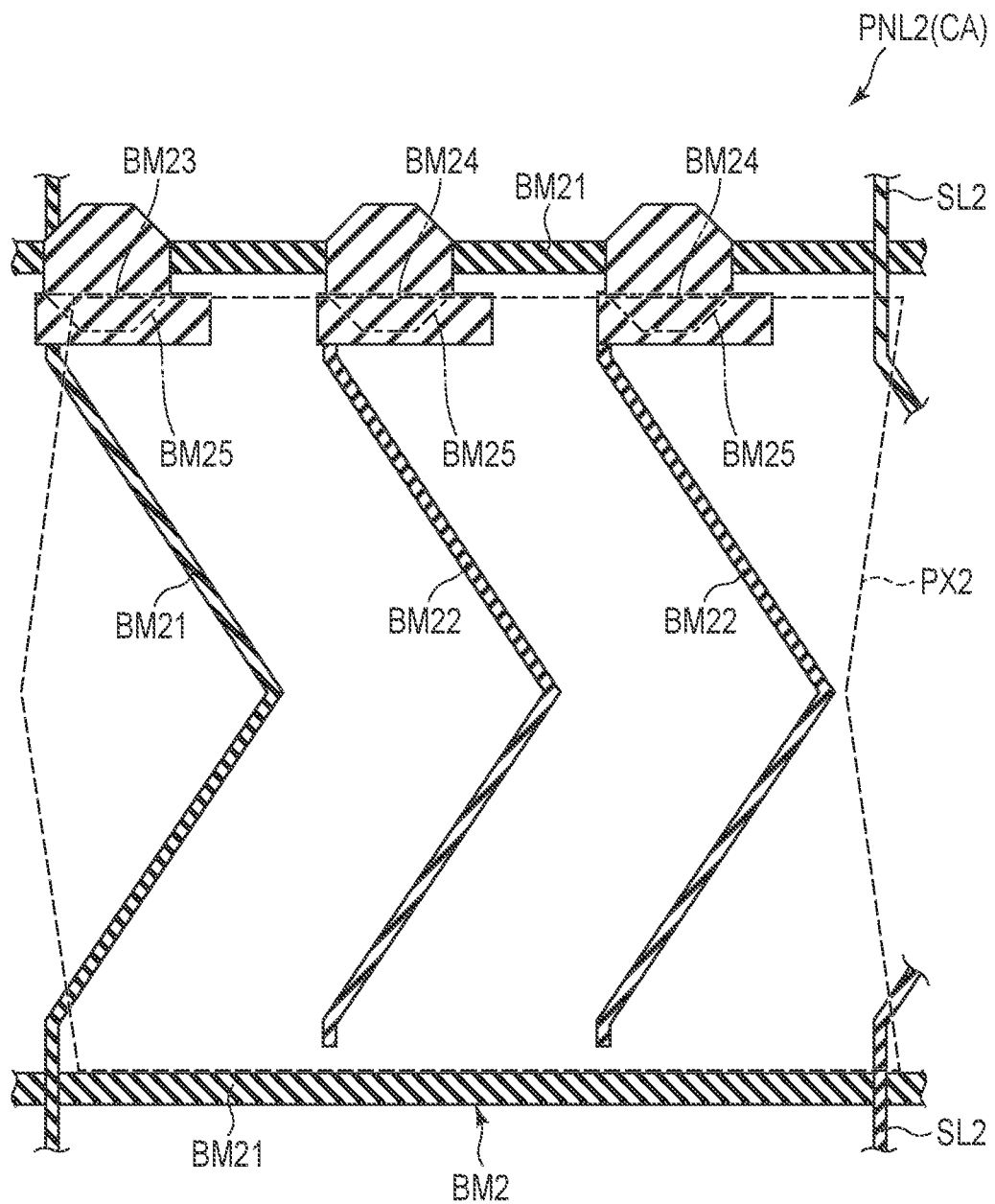
FIG. 7 is a plan view showing a shape of a light-shielding film disposed in the dimming panel in the same embodiment.

FIG. 7 is a plan view showing the light-shielding film BM2 disposed in the second transparent substrate SUB22 of the dimming panel PNL2 in detail.

As shown in FIG. 7, in the dimming panel PNL2, the light-shielding film BM2 has a shape different from that of the pixel PX2. More specifically, the light-shielding film BM2 includes a first portion BM21, a second portion BM22, a third portion BM23, a fourth portion BM24, and a fifth portion BM25.

The first portion BM21 is disposed to overlap the scanning line GL2 and the signal line SL2 in plan view, extends along the first direction X as in the case of the scanning line GL2, and extends along the second direction Y while bending in the directions d3 and d4 as in the case of the signal line SL2. The second portion BM22 is disposed to overcome the dummy signal line DSL in plan view, and extends along the second direction Y while bending in the directions d3 and d4 as in the case of the dummy signal line DSL.

The third portion BM23 is disposed to overlap the switching element SW in plan view, electrically connected to the respective scanning line GL2 and the respective signal line SL2. The fourth portion BM24 is a portion equivalent to the third portion BM23 of the dummy signal line DSL, and is arranged in a shape similar to that of the third portion BM23 in one end of the dummy signal line DSL. Thus, even though there is no switching element connected to the dummy signal line DSL, when the fourth portion BM2, which has a shape similar to that of the third portion BM3, the light-shielding films BM2 can be evenly distributed to the pixel PX2, thus suppressing uneven brightness.

The fifth portion BM25 is disposed to overlap in plan view the spacer to maintain the gap (spacing) between the first transparent substrate SUB12 and the second transparent substrate SUB22.

Note that FIG. 7 illustrates an example case where the light-shielding film BM2 includes the first portion BM21 to the fifth portion BM25, but the dimming panel PNL2 is not easily affected by outdoor light, and therefore the light-shielding film BM2 may have such a structure that part of the first portion BM21 to the fifth portion BM25 are omitted.

Figure 8:
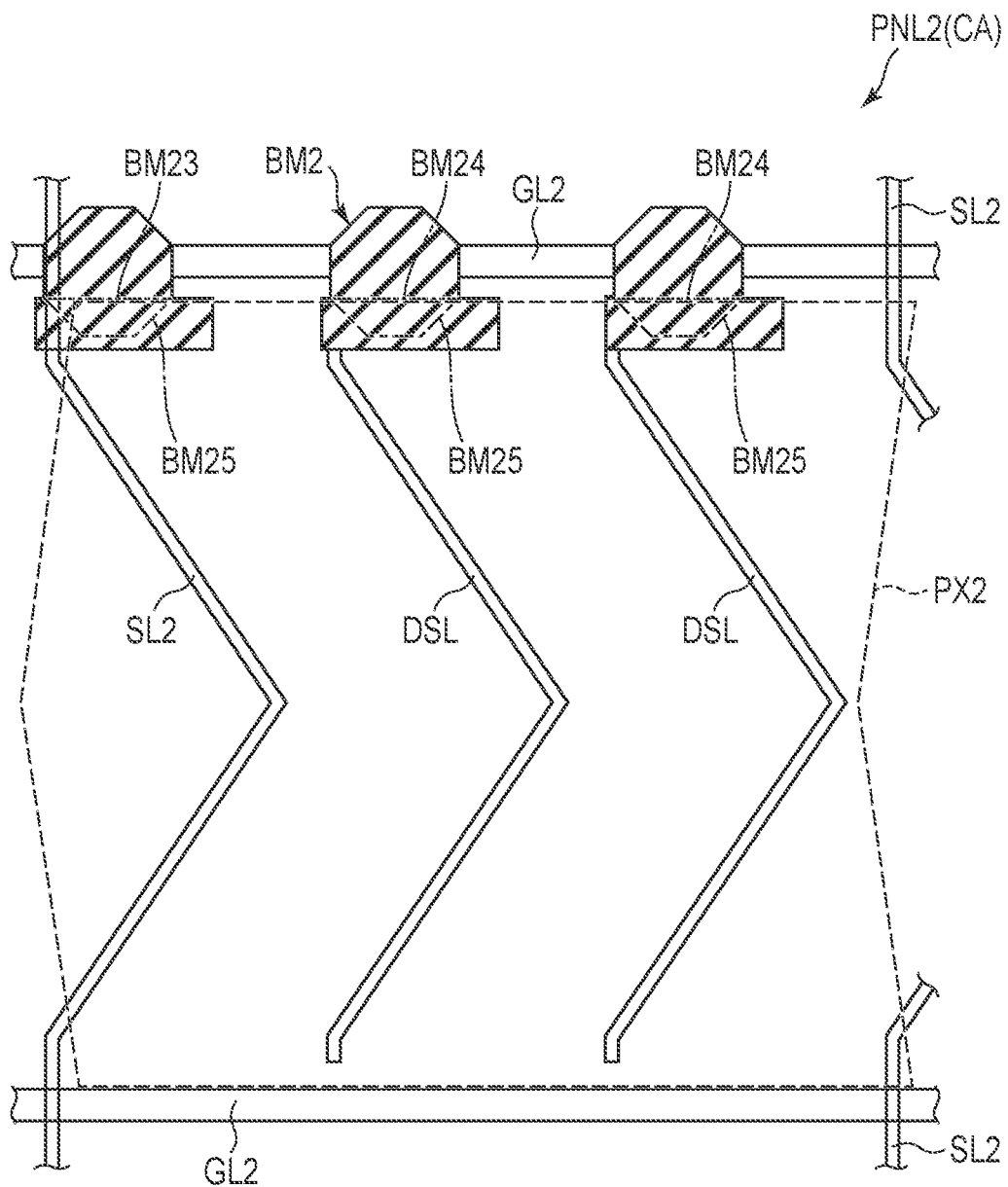
FIG. 8 is a plan view showing another shape of the light-shielding film disposed in the dimming panel in the same embodiment.
Figure 9:
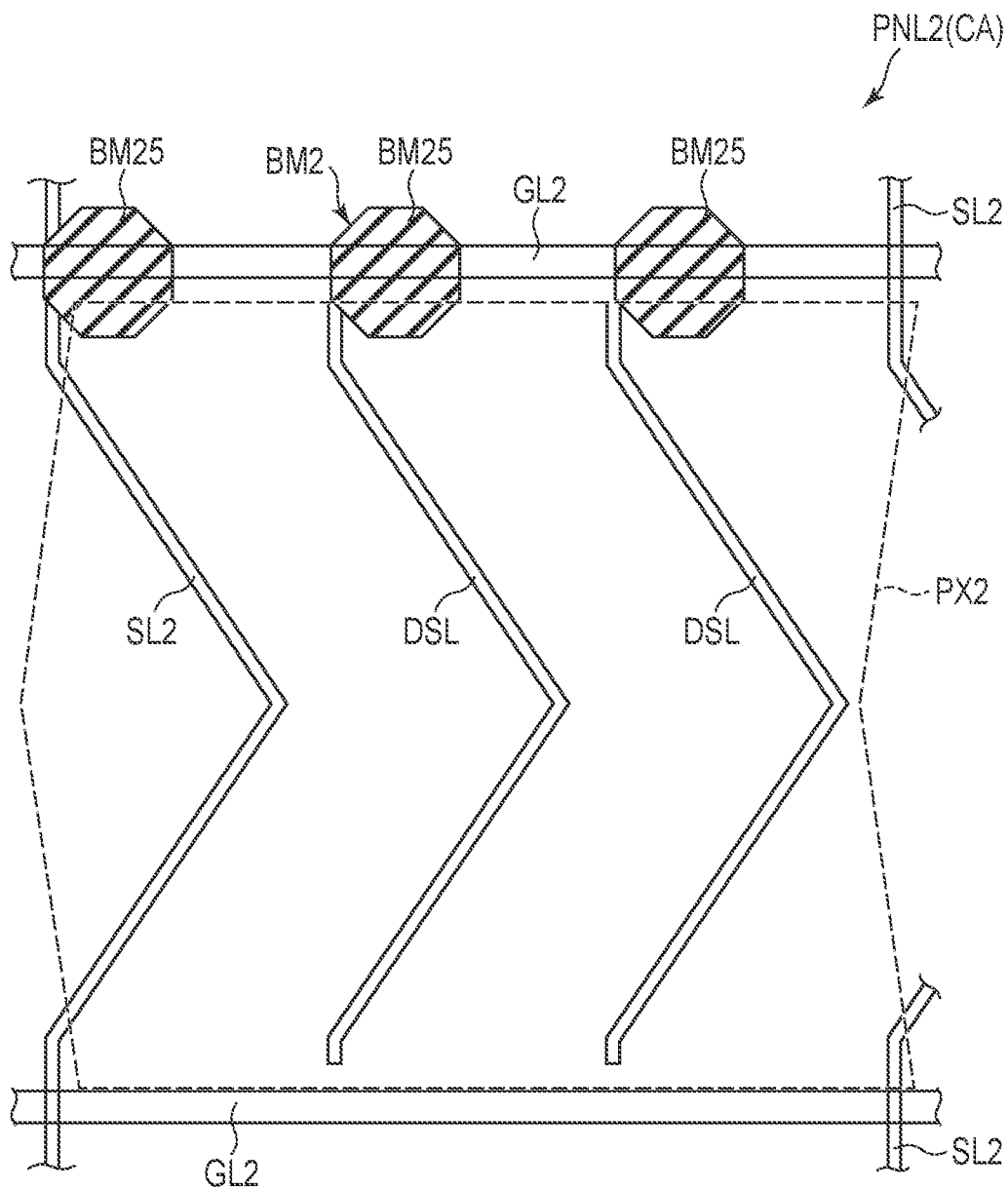
FIG. 9 is a plan view showing still another shape of the light-shielding film disposed in the dimming panel in the same embodiment.

For example, as shown in FIG. 8, the light-shielding film BM2 may have such a shape that part of the first portion BM21 to the fifth portion BM25 is omitted from the shape shown in FIG. 7. Alternatively, as shown in FIG. 9, the shape of the light-shielding film BM2 may have such a shape that the first portion BM21 to the fourth portion BM24 are omitted from the shape shown in FIG. 7. According to the shape of the light-shielding film BM2 shown in FIGS. 8 and 9, the opening ratio of the pixels PX2 can be improved by the amount to the extent that the light-shielding film BM2 is omitted.

In the following descriptions, the effects of the display device DSP of this embodiment will be described using a comparative example. Note that the comparative example is intended to illustrate some of the effects achievable by the display device DSP, and the effects common to the comparative examples and the present embodiment are not excluded from the scope of the present invention.

Figure 10:
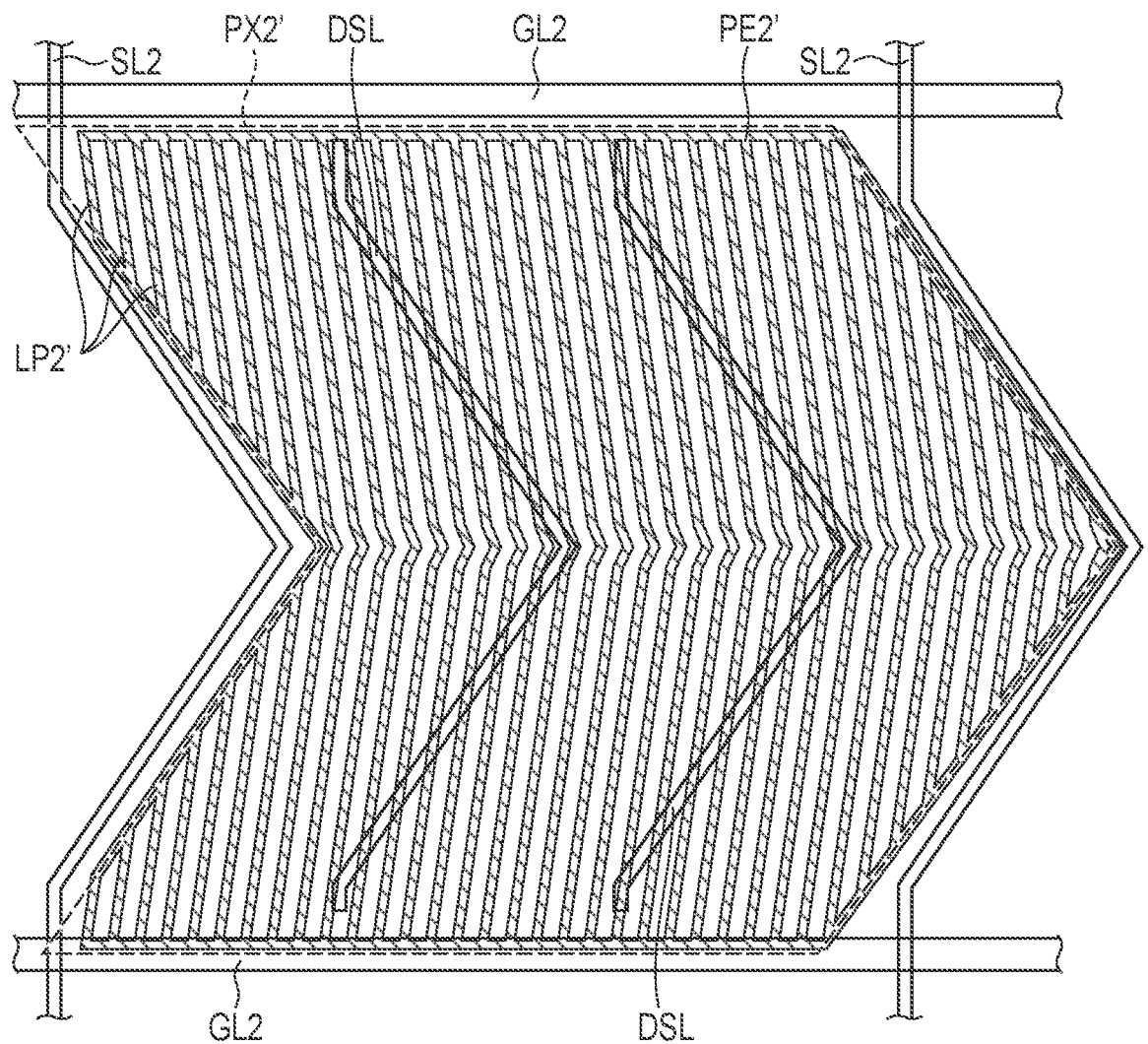
FIG. 10 is a plan view showing pixels disposed in a dimming panel according to a comparative example.
Figure 10:
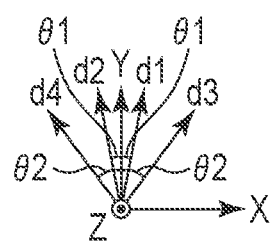

FIG. 10 is a plan view showing a pixel PX2' disposed in a dimming panel according to the comparative example. The pixel PX2' of the comparative example is different from that of the embodiment in that it is disposed in a region surrounded by two adjacent scanning lines GL2 and two adjacent signal lines SL2, and a pixel electrode PE2' contained in the pixel PX2' has a shape which fits the region surrounded by the two adjacent scanning lines GL2 and the two adjacent signal lines SL2.

Generally, the bending shape of a plurality of line portions which constitutes a pixel electrode is optimized, and it is considered to be preferable that the line portions of the pixel electrode be bent along the directions d1 and d2 which intersect the second direction Y at an angle θ1. Therefore, if the pixel electrodes are formed into a shape that fits the region surrounded by the two signal lines SL2 having a bending shape which bends along the directions d3 and d4 intersecting the second direction Y at an angle θ2, unlike the optimized bending shape of the line portions and the two adjacent scanning lines GL2, the pixel electrode PE2' is broken at a bending edge of the pixel electrode PE2', or the line portion LP2' is formed into a shape which is different from the optimal shape as shown in FIG. 10. Due to this structure, when the liquid crystal layer is driven, alignment errors occur in the end portion of the pixel electrode PE2', resulting in degradation in the display quality of the display device.

By contrast, in this embodiment, the pixel electrode PE2 contained in the pixel PX2 is formed not into a shape which fits the region surrounded by the two adjacent scanning lines GL2 and the two adjacent signal lines SL2, but into a shape different from that of the region, and thus all the line portions LP2 which constitute the pixel electrode PE2 are formed into an optimized shape. With this structure, if the liquid crystal layer LC2 is driven, alignment errors do not occur at the end portion of the pixel electrode PE2 and the display quality is not degraded because the line portion LP2 contained in the pixel electrode PE2 is not cut in the middle, or the shape of the line portion LP2 becomes different from the optimized shape, unlike the comparative example shown in FIG. 10. In short, the display quality of the display device can be improved compared to that of the comparative example.

Further, in this embodiment, the pixel electrode PE2 contained in the pixel PX2 can be formed into a shape similar to that of the pixel electrode PE1 of the liquid crystal display panel PNL1, and therefore when the liquid crystal display panel PNL1 and the dimming panel PNL2 are superimposed on each other, the pixel electrode PE1 and the pixel electrode PE2 are not misaligned with each other.

Figure 11:
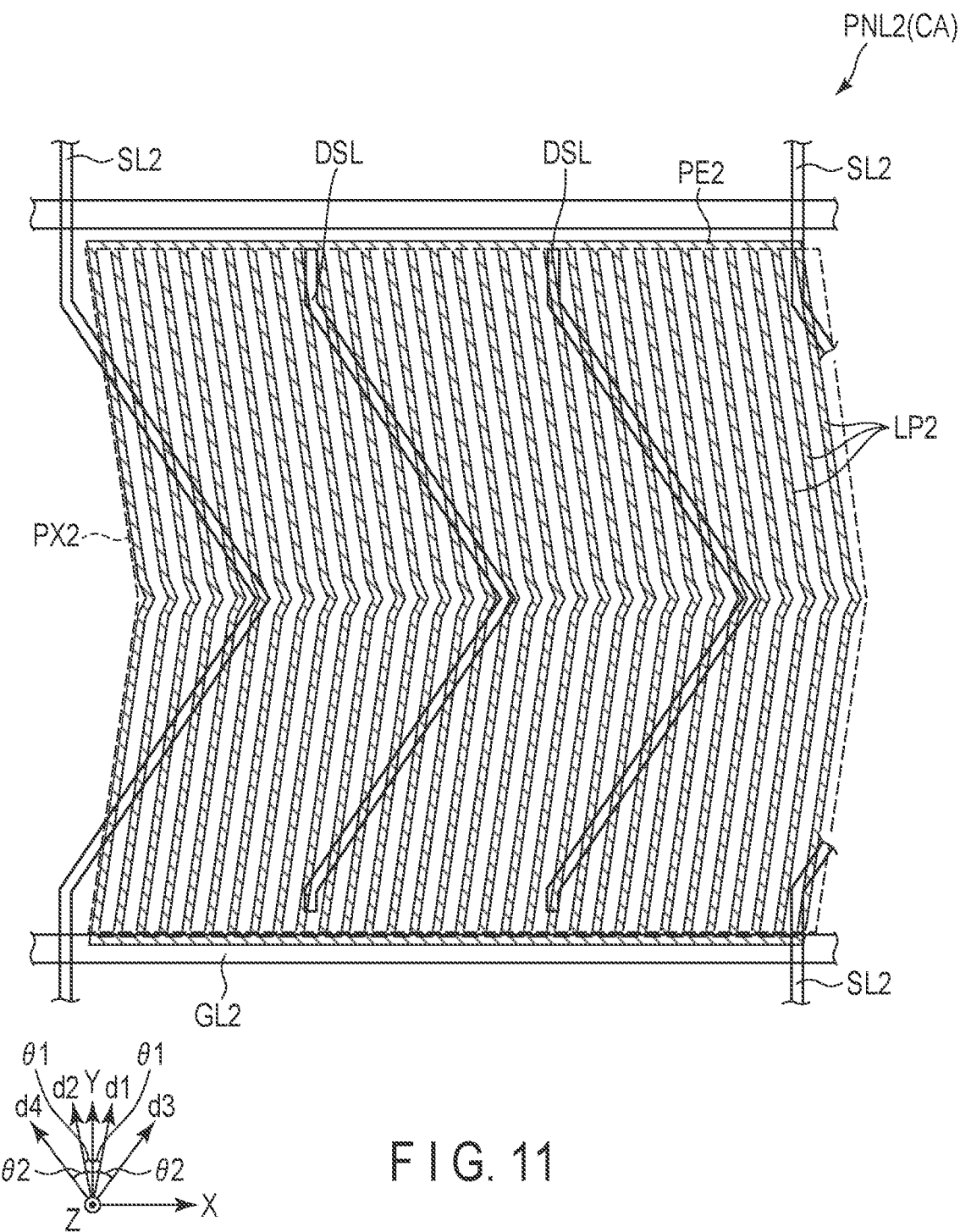
FIG. 11 is another plan view showing in detail the pixels disposed in the dimming panel in to the same embodiment.

Note that this embodiment illustrates an example case where the bending direction of the line portions LP2 that constitute the pixel electrode PE2 of the dimming panel PNL2 is opposite to the bending direction of the signal line SL2 of the dimming panel PNL2, but the bending direction of the line portion LP2 may be the same as the bending direction of the signal line SL2 as shown in FIG. 11. Even in this case, the following configurations remain unchanged. That is, the bending angle of the line portions LP2, which constitute the pixel electrode PE2 is different from the bending angle of the signal line SL2, and all the line portions LP2 are formed to have an optimized shape, and a plurality of line portions LP2 are formed to extend in the second direction Y so as to cross (straddle) the signal line SL2 in plan view. Therefore, the occurrence of the alignment errors can be suppressed, and it is possible to improve the display quality of the display device.

According to one embodiment described above, the display quality of the display device DSP comprising two display panels, namely, a liquid crystal display panel PNL1 and a dimming panel PNL2, can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a first display panel including a display area for displaying images;
a second display panel including a dimming area for controlling brightness of the display area; and
an adhesive layer which adheres the first display panel and the second display panel to each other,
the first display panel comprising:
a first scanning line extending along a first direction, a first signal line extending in a second direction intersecting the first direction while bending in a first bending direction, a first pixel electrically connected to the first scanning line and the first signal line, the first pixel including a first pixel electrode including a plurality of first line portions extending parallel to the first signal line, and
the second display panel comprising:
a second scanning line extending along the first direction, a second signal line extending in the second direction while bending in a second bending direction, and a second pixel electrically connected to the second scanning line and the second signal line, the second pixel including a second pixel electrode including a plurality of second line portions intersecting the second signal line in plan view, wherein
a bending shape of the first signal line is different from a bending shape of the second signal line, and
the second signal line bends in an opposite side to the first signal line.

2. The display device of claim 1, wherein
the plurality of second line portions extend in the second direction while bending in the first bending direction and cross the second signal line in plan view.

3. The display device of claim 1, wherein
a bending angle of the first signal line made by the second direction and the first bending direction is smaller than a bending angle of the second signal line made by the second direction and the second bending direction.

4. The display device of claim 1, wherein
a bending shape of the plurality of first line portions and a bending shape of the plurality of second line portions are the same as each other.

5. The display device of claim 4, wherein
a bending shape of the first signal line is the same as the bending shape of the plurality of first line portions, and
a bending shape of the second signal line is different from the bending shape of the plurality of second line portions.

6. The display device of claim 1, wherein
the plurality of second line portions are disposed to be spaced apart from each other at equal intervals along the first direction.

7. The display device of claim 6, wherein
the second pixel electrode and an other second pixel electrode disposed adjacent to the second pixel electrode along the first direction are spaced apart from each other at an interval equal to a distance between two second line portions adjacent to each other along the first direction.

8. The display device of claim 7, wherein an interval between the second pixel electrode and the other second pixel electrode is 10 µm or less.

9. The display device of claim 1, wherein
the second display panel further comprises a first substrate, a second substrate opposing the first substrate, a liquid crystal layer disposed between the first substrate and the second substrate, a spacer which maintains an interval between the first substrate and the second substrate, and a light-shielding film, and
the light-shielding film is disposed in a position overlapping the spacer in plan view.

10. The display device of claim 9, wherein
the light shielding film is further disposed in a position overlapping the switching element which electrically connects the second scanning line and the second signal line thereto in plan view.

11. The display device of claim 10, wherein
the light-shielding film is further disposed in a position overlapping the second scanning line and the second signal line in plan view.

* * * * *